United States Patent [19]

Grundström et al.

[11] 4,082,048
[45] Apr. 4, 1978

[54] PLANTING DIBBLE

[76] Inventors: Erik Hilding Grundström; Göte Einar Grundström; Ivar Waleij, all of 8 Sockenvagen, Dorotea, Sweden, S-910 70

[21] Appl. No.: 680,799

[22] Filed: Apr. 27, 1976

[30] Foreign Application Priority Data

Apr. 30, 1975  Sweden ............................ 7505054

[51] Int. Cl.² .................. A01C 11/02; A01C 5/04; A01G 23/04
[52] U.S. Cl. ............................... 111/2; 111/3; 111/89
[58] Field of Search ........................ 111/2–4, 111/89–99

[56] References Cited

U.S. PATENT DOCUMENTS

| | | | |
|---|---|---|---|
| 181,065 | 8/1876 | Goodwin | 111/4 |
| 191,601 | 6/1877 | Knox | 111/4 |
| 610,625 | 9/1898 | Grim | 111/4 |
| 1,396,784 | 11/1921 | Samuels et al. | 111/89 |
| 1,778,701 | 10/1930 | Williams | 111/4 |
| 2,195,765 | 4/1940 | Caulk | 111/4 |
| 3,460,277 | 8/1969 | Grover et al. | 111/2 X |
| 3,943,863 | 3/1976 | Leonard et al. | 111/89 X |
| 3,972,294 | 8/1976 | Grundstrom et al. | 111/3 |

FOREIGN PATENT DOCUMENTS

| | | | |
|---|---|---|---|
| 45,369 | 2/1932 | Denmark | 111/3 |
| 688,921 | 8/1930 | France | 111/4 |
| 292,052 | 3/1915 | Germany | 111/3 |
| 308,825 | 8/1955 | Switzerland | 111/2 |

Primary Examiner—Edgar S. Burr
Assistant Examiner—Steven A. Bratlie
Attorney, Agent, or Firm—Burns, Doane, Swecker & Mathis

[57] ABSTRACT

The planting dibble of the invention comprises a hole-opening member connected to a piston-cylinder means which latter is a part of a planting tube and which activates the hole-opening member between closed position and a spread-apart position.

4 Claims, 3 Drawing Figures

PLANTING DIBBLE

This invention relates to a planting dibble for the mechanical planting of plants, preferably rooted in clods, in holes in the soil, comprising a member consisting of at least two parts adapted to be pressed down into the soil for opening a hole, and a tube supporting this hole opening member, the end of which facing to the soil is closed by the hole opening member in its position for opening a hole in order to establish a waiting position for the plant to be planted.

The present invention has the object to further develop and improve the aforesaid planting dibble. This object is achieved thereby that the dibble according to the present invention is characterized in that the hole opening member consisting of at least two parts by means of a pin carrying laterally movably the parts of the hole opening member is connected to a piston-cylinder means provided in the tube for moving the hole opening member from the position closing the tube to a spread-apart position and, respectively, from the spread-apart position to the position closing the tube, said movement being guided by diverging guide grooves.

Figure 1:
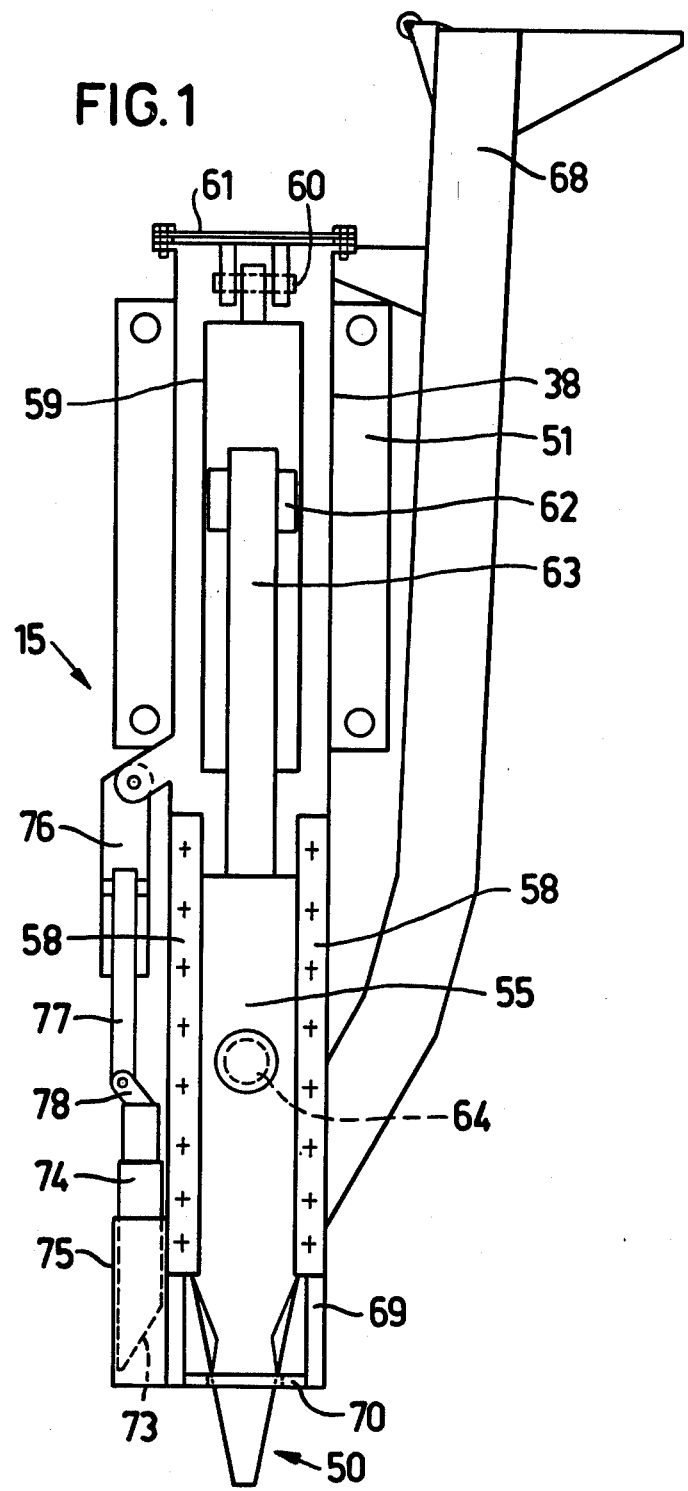
Figure 2:
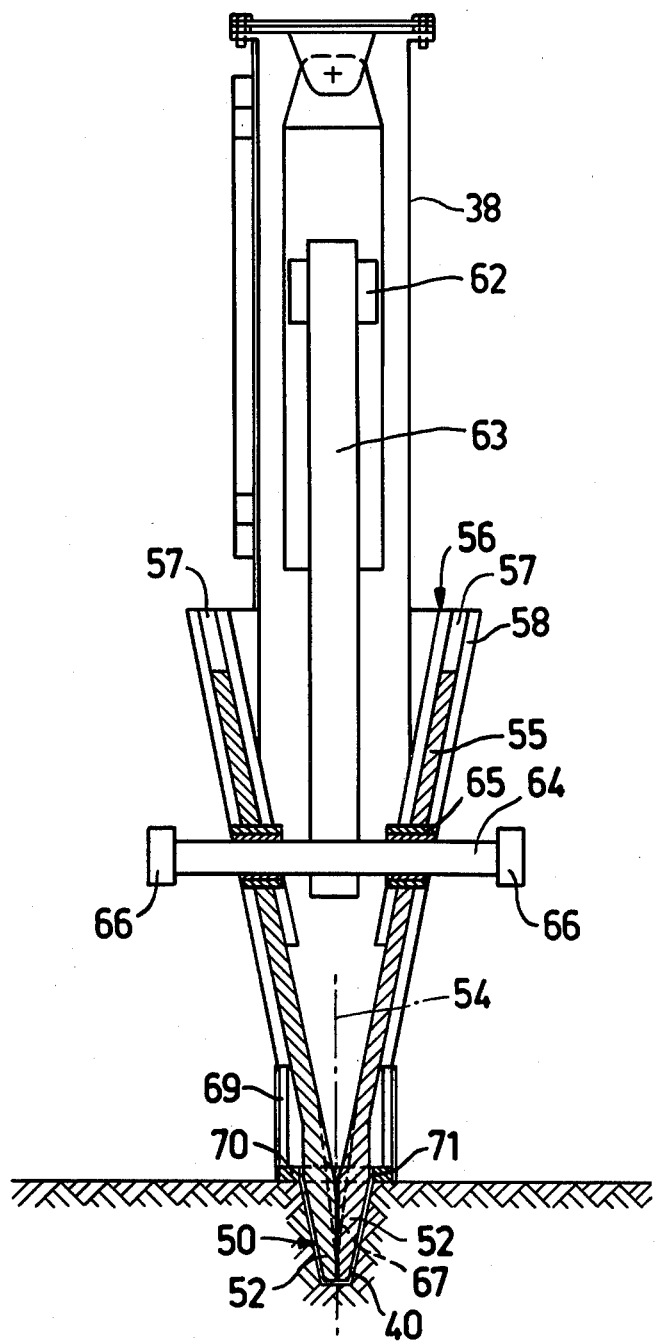
Figure 3:
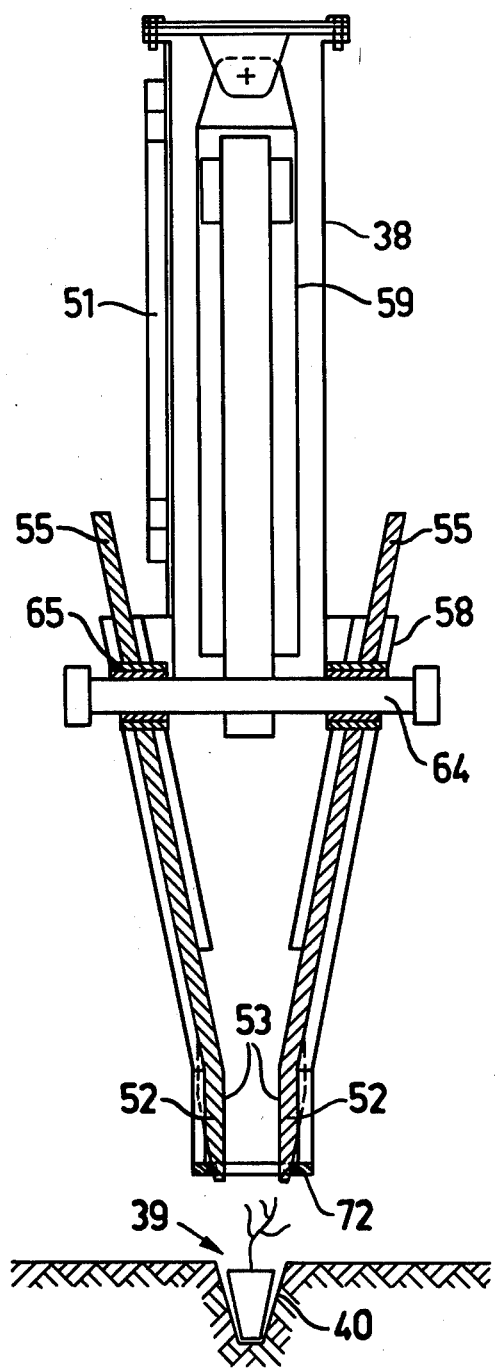

Further characterizing features become apparent from the following description of an embodiment of the invention selected by way of example and by the accompanying drawings, in which FIG. 1 is a front view of an embodiment of the planting dibble according to the invention in hole opening position, FIG. 2 is a lateral view, partially in section, of the planting dibble according to FIG. 1, and FIG. 3 is the same view as in FIG. 2, but shows the planting dibble in its plant dropping position immediately after the dropping of a plant.

The numeral 15 designates generally the planting dibble according to the present embodiment of the invention, which comprises a member 50 adapted to be pressed down into the soil for opening a hole 40, and a tube 38 supporting said hole opening member. The tube is provided with a holding plate 51 for mounting the planting dibble 15 on a planting machine, which is movable in relation to the planting dibble when the dibble is pressed down into the soil, and which is provided with means for lowering the planting dibble to the soil and for pressing its hole opening member down into the soil after a plant 39 has been dropped into the hole 40 opened in the soil.

The hole opening member 50 or the pointed end of the planting dibble consists of two halves 52, which can be moved together and spread apart. The surfaces 53 facing to each other of the halves are in parallel with each other and with a schematically indicated vertical plane through the planting dibble at 54. Said halves have a cross-sectional shape tapering in downward direction preferably in such a manner, that the two halves 52 in their assembled position, i.e. their hole opening position, have the form of a cone with downward turned top, which may be blunt as in FIG. 2 or acute. For being moved together and spread apart, the halves 52 are formed integral each with a sliding plate 55 or connected thereto in another way. These plates are arranged on both sides of the vertical plane 54 in a superstructure 56 of the tube 38 for being moved simultaneously linearly each in a plane intersecting the vertical plane 54 at the same acute angle and include between themselves an angle, which should be the same as the cone angle of the hole opening member. The sliding plates 55, which can but must not have a certain arc-shaped cross-section, are with their longitudinal and parallel edge portions guided with slide fit in guide grooves 57 provided in the plane of movement of the sliding plates in the superstructure 56 of the tube, and each guide groove 57 is defined outwardly by a support bar 58, which is screwn on the superstructure and, thus, can be removed, if necessary.

The simultaneous movement of the sliding plates 55 in the guide grooves 57 is effected by a piston-cylinder means 59, which by a pin 60 is pivotally suspended on a cover 61 screwed on the upper end of the tube 38. The piston rod 63 of the piston 62 is connected to a pin 64, which extends through holes with slide bushings 65 in the sliding plates 55 and is at the ends provided with stop members 66, of which at least one is detachable. The piston-cylinder means 59 is double-acting, in such a manner, that upon the supply of pressure medium to the lower surface of the piston 62 the two sliding plates 55 are moved in upward direction whereby the halves 52 of the hole opening member are spread apart to the position shown in FIG. 3, i.e. the plant dropping position, and upon supply of pressure medium to the opposite surface of the piston the sliding plates 55 are moved in downward direction whereby the halves 52 of the hole opening member are moved together to the position shown in FIG. 2, i.e. the hole opening position. During these movements the sliding plates 55 so to say travel outward and, respectively, inward of the pin 64, which moves unobstructed between the support bars 58 of the respective sliding plate.

In their assembled position shown in FIGS. 1 and 2 the two halves 52 of the hole opening member form with their portions turned upward between the sliding plates a parking or waiting position for the plant to be planted in the hole 40 formed by said two halves upon the depression of the planting dibble into the soil. Said waiting position can be made more distinct that achievable only with the lower portions of the sliding plates 55 by making a conic crater or boring in the surfaces 53 facing toward each other of the halves as indicated by dashed lines 67 in FIG. 2. The plants are supplied to this waiting position by means of a transport pipe 68 provided to the side of the tube 38, which pipe can be connected directly or indirectly to a feed table of the machine for receiving one plant at a time and opens into the lower portion of the tube 38 or its superstructure 56 between the sliding plates 55, which by their inclination lead the plants to said position, so that the plants always are turned correctly in their waiting position.

At a suitable distance beneath the planting dibble proper a support plate 70 with an aperture 71 is fastened by stays 69. The circumferential edge 72 of the plate constitutes a means for guiding and holding together the two halves 52 of the hole opening member during their movement between the hole opening and plant dropping positions and during the depression of the hole opening member into the soil for forming a hole 40 for the plant in waiting position. The aperture 71 in the support plate 70 is given the same dimensions as the greatest cross-section of the hole opening member in the hole opening position, or as the cross-section, which in the hole opening position, i.e. in the lowermost end position of the two halves, lies on the same level as the support plate 70. The support plate also has the object to limit the depression movement of the hole opening member into the soil and, in other words, determines by its position in relation to the end of the fully projecting hole opening member the depth of the hole. The hole opened in the soil, thus, is given a depth corresponding to the distance from said end to the support plate 70.

At the shown embodiment of the planting dibble according to the invention, on the side opposed to the transport pipe 68 a pressing member 74 with a chamfered end portion 73 and preferably with square cross-section is provided, which is guided in a sleeve 75 attached to the lower portion of the tube 38 and having the same cross-sectional shape as the pressing member, which member is operated by a piston-cylinder means 76 pivotally suspended on the tube 38. The piston rod 77 of said means is connected to the pressing member via a pivotal yoke 78 or the like.

The hole opening member 50 being in the hole opening position shown in FIGS. 1 and 2, and a plant being in said waiting position, the hole opening member of the plant dibble is pressed down into the soil to the intended depth, which is determined by the support plate 70. Thereafter the piston-cylinder means 59 within the tube 38 is switched-on for moving the sliding plates in upward direction whereby both halves 52 of the hole opening member are spread apart and drop the plant 39 in waiting position down into the hole thus formed. Thereafter a pressing of the plant by the pressing member 74 is effected, and the planting dibble is then lifted up from the soil and transported to the next planting place. During this transport the two halves 52 of the hole opening member are returned to their hole opening position, and a new plant can be inserted into waiting position. The planting dibble is ready for planting a new plant.

The invention is not restricted to the embodiment described above and shown in the drawings, but can be altered and modified in many different ways within the scope of the claims.

What we claim is:

1. A planting dibble for the mechanical planting of plants in holes made in the soil, preferably plants rooted in clods, comprising:
   a tube supporting a hole-making member at the end of said tube facing toward the soil;
   said hole-making member comprising at least two parts, said two parts of said hole-making member being arranged at respective lower ends of respective spaced sliding plates guided in respective diverging guide grooves;
   said guide grooves diverging upwardly from said tube end;
   each of said plates connected by means of a common transverse pin slidably mounted in a hole with a slide bushing in each respective plate;
   said common transverse pin connected for reciprocal movement along the longitudinal axis of said tube to a piston-cylinder means provided within said tube;
   said piston-cylinder moving said pin connected plates in said guide grooves and therefor said two parts from a closed position closing said end of said tube to a spread-apart position opening said end of said tube and, from said spread-apart position to said closed position, each said slide bushing allowing said common transverse pin to adjust to either position;
   said closed position defining a hole-making position and a plant waiting position for a plant to be planted;
   a transport pipe for feeding a plant to said waiting position, said transport pipe being attached to the outside of said tube and opening into said tube directly above the defined waiting position and below the lowest position of said common transverse pin; and
   an apertured plate connected to said lower end of said tube, the inner circumferential edge of said apertured plate defining a means for supporting and holding together said at least two parts of said hole-making member within the aperture in said apertured plate during reciprocal movement to and from said closed position and said spread-apart position.

2. A planting dibble according to claim 1, wherein the piston-cylinder means is pivotally suspended on a cover screwed on the upper end of the tube.

3. A planting dibble according to claim 1, wherein a pressing member operated by a piston-cylinder means is provided on the outside of the tube.

4. A planting dibble according to claim 1, in which the hole-making member in said closed position has the form of a cone with a downward turned top, the diverging guide grooves being inclined at the same angle and forming between them an angle equal to the cone angle.

* * * * *